United States Patent [19]
Babbin et al.

[11] 3,966,387
[45] June 29, 1976

[54] APPARATUS FOR VULCANIZING HOSE

[75] Inventors: William R. Babbin; Stephen C. Sabo, both of Barberton, Ohio

[73] Assignee: The B. F. Goodrich Company, Akron, Ohio

[22] Filed: June 5, 1975

[21] Appl. No.: 584,056

[52] U.S. Cl. ............................... 425/445; 425/392
[51] Int. Cl.² ...................... B29D 23/00; B29H 7/14
[58] Field of Search ............. 425/90, 392, 397, 445, 425/446

[56] References Cited
UNITED STATES PATENTS

| | | | |
|---|---|---|---|
| 1,210,938 | 1/1917 | Hewitt | 425/392 |
| 1,949,226 | 2/1934 | Wallace | 425/392 |
| 2,483,709 | 10/1949 | Paulsen | 425/445 |
| 3,690,796 | 9/1972 | Bossvold | 425/90 |

Primary Examiner—J. Howard Flint, Jr.
Attorney, Agent, or Firm—Harry F. Pepper, Jr.; W. A. Shira, Jr.

[57] ABSTRACT

An apparatus adapted for continuously vulcanizing elastomeric hose comprises a tubular, helically extending vulcanizing chamber with an entrance for unvulcanized hose at one end and an exit for vulcanized hose at the other end. Means are provided to circulate fluid at elevated temperatures and pressures through the chamber thereby transporting the hose therethrough while simultaneously providing the heat and pressure required for satisfactory vulcanization. Special sealing means are provided to permit the flaccid hose structure continuous entry to the chamber while effectively preventing escape of pressurized fluid contained therein.

6 Claims, 6 Drawing Figures

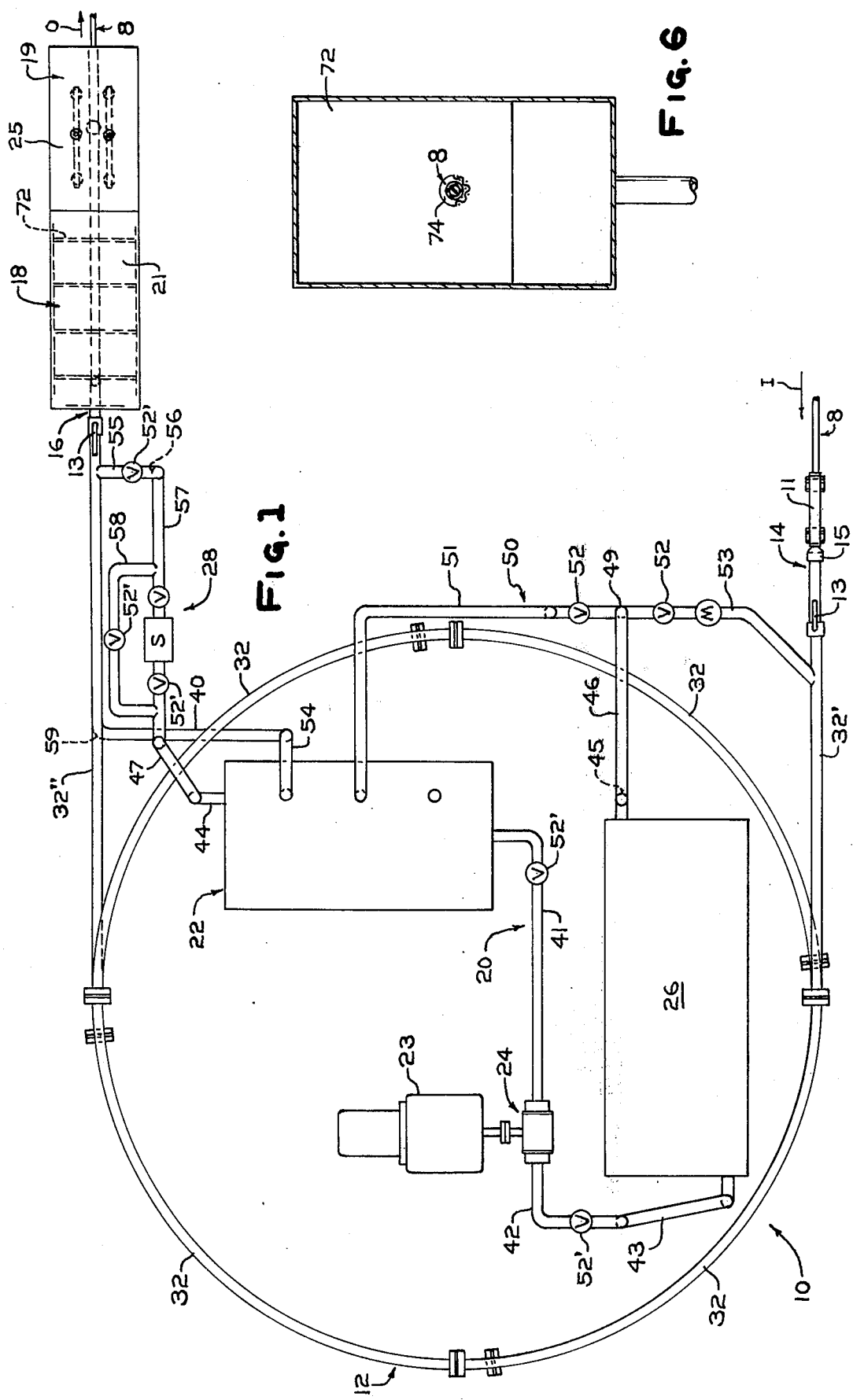

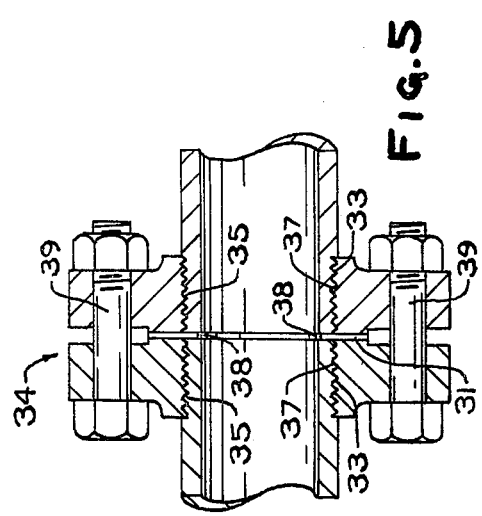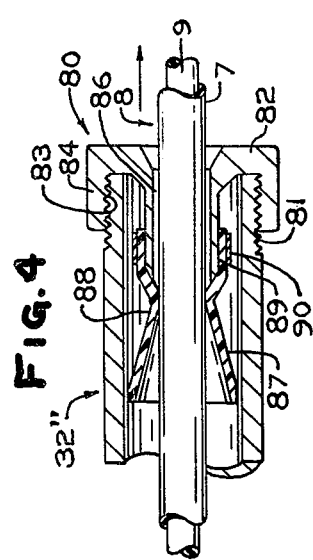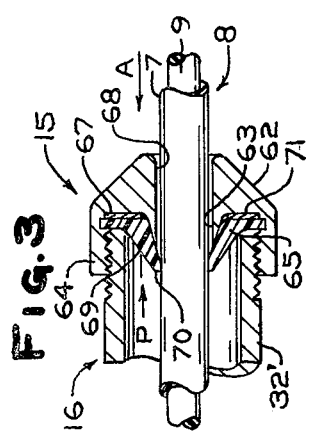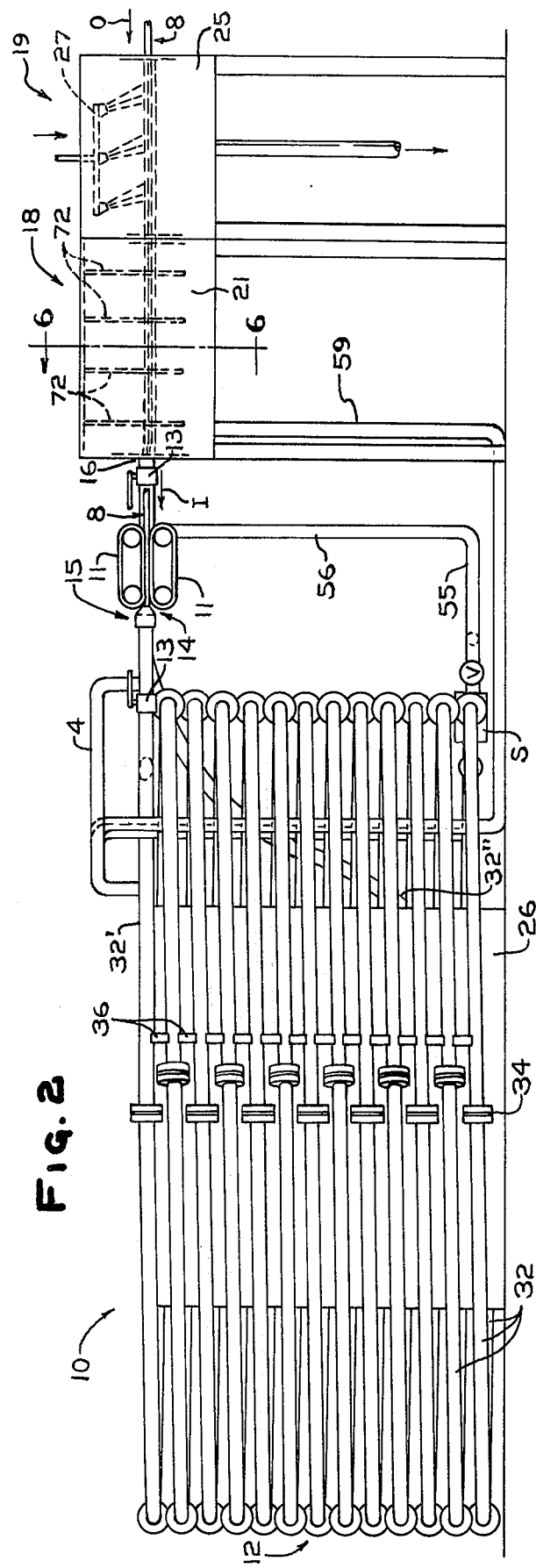

APPARATUS FOR VULCANIZING HOSE

BACKGROUND

The invention relates to apparatus used in the manufacture of rubber hose and in particular to apparatus used to vulcanize such hose.

Current manufacture of rubber hose, particularly reinforced rubber hose, typically includes forming an unvulcanized elastomeric hose structure around a flexible, solid rubber mandrel and encasing the hose and mandrel within a pressure sheath or cover of lead or other suitable material in preparation for vulcanizaton or "cure". The sheath is considered necessary to maintain pressure against the hose outer surface preventing any defects which might otherwise develop during vulcanization. Spooled or otherwise supported lengths of sheathed, mandreled, unvulcanized hose are then placed in heated enclosures, such as ovens, where they remain until cured. After removal from the oven, the outer sheath is stripped and the internal mandrel removed from the vulcanized hose.

Proposed modified or alternate techniques in this field often involve improving hose vulcanization by obviating need for the normally necessary outer pressure sheath and/or effecting vulcanization or cure of hose in a more continuous manner. Exemplary of such proposals are the continuous passage of sheathed hose into a vulcanizing chamber, around a moving spool therein and withdrawal from the chamber (e.g. see U.S. Pat. No. 3,690,796); carrying of the hose through a tubular chamber by means of hot vulcanizing fluid such as oil (see U.S. Pat. Nos. 1,661,888 and 3,475,397); and moving the hose through long, heated, salt, or other particulate, bath-type troughs.

Principal advantages allegedly achieved by transport of hose through a tubular chamber by hot fluid are that the use of an outer pressure sheath over the hose during cure is unnecessary, that such a technique lends itself readily to space-saving designs, and that the procedure is continuous. However, it is often found that certain elastomeric hose, particularly of the reinforced type, vulcanized by such techniques delaminates or develops holes, blisters, and other serious functional and/or cosmetic defects, unless the hose transporting and vulcanizing fluid is sufficiently pressurized while circulating through the chamber. Furthermore, when using such techniques in vulcanizing mandreled hose, pressurization of the curing and transporting fluid is practically essential to maintain the inner diameter of the hose uniform.

However, to continuously transport hose through a tubular chamber with hot, pressurized fluid presents further problems in operation and safety which have prevented widespread use of what should theoretically be a more simplified and efficient approach to vulcanization of hose. Primary of these problems rest largely in the provision of adequate sealing which will dependably confine the hot, circulating, high pressure fluid within the curing chamber, but still permit entry and exit of the limp or flaccid hose in a simple, efficient, expeditious and continuous manner.

SUMMARY

This invention provides an improved apparatus capable of continuously vulcanizing elastomeric hose while free of an outer pressure sheath or covering. The apparatus generally includes a compactly arranged vulcanizing chamber; means to circulate hose transporting and vulcanizing fluid through the chamber; fluid pumping and heating devices for maintaining the circulating fluid at certain temperatures and pressures at selected zones within the apparatus; special sealing devices at the entrance to, and if desired, exit from the chamber; and handling and treatment means for vulcanized hose leaving the chamber.

The vulcanizing chamber is preferably formed of a series of arcuate sections of tubular pipe interconnected so as to extend in a helical path about a vertical axis. The length of the chamber can thus be altered simply by adding or removing selected pipe sections or interconnected groups of such sections.

Transporting and vulcanizing fluid for use in the chamber is circulated through a closed system which includes various main and branch conduit lines through which fluid flows to and from a storage reservoir. Means are provided within this system to heat and pressurize the fluid for inlet to the chamber adjacent the hose entrance to the chamber. Fluid recovery means are provided adjacent the chamber exit to recycle exiting fluid to the storage reservoir.

A special sealing device is provided at the entrance to the chamber which effects temporary axial stiffening to the normally flaccid hose as it enters the fluid pressurized chamber, while preventing escape of hot pressurized fluid through the entrance. A special seal may be provided at the exit end, if desired, which temporarily stiffens the exiting flaccid hose, while restricting flow of fluid. Each sealing device comprises basically a flexible sealing member which maintains self-adjusting, effective, peripheral contact with the hose as it moves therethrough without surface damage.

At the exit end of the chamber are means to handle and treat vulcanized hose leaving the chamber which comprises a receiving tank and washing compartment. The receiving tank comprises one or more baffle plates with a central opening through which the hose passes. The baffle plates block further movement of any vulcanizing fluid which exits with the hose and diverts the fluid to a drain opening at the bottom of the tank. The drain opening in the exit tank allows excess fluid to pass from the receiving tank to the storage reservoir for re-circulation through the vulcanizing chamber. A washing compartment is disposed adjacent the receiving tank wherein appropriate liquid is sprayed upon the hose, further removing the transporting and vulcanizing fluid while cooling the hose.

THE DRAWINGS

In the drawings, in which like reference numerals refer to like structural features, the invention is illustrated in accordance with a presently preferred embodiment wherein:

FIG. 1 is a plan view of a hose vulcanizing apparatus illustrating an arrangement of its parts, some of the parts being represented schematically;

FIG. 2 is an elevational view of the apparatus illustrated in FIG. 1;

FIG. 3 is an enlarged longitudinal section view showing details of a preferred entrance sealing means used in the apparatus of FIGS. 1 and 2;

FIG. 4 is an enlarged longitudinal section view showing details of a preferred exit sealing means which may optionally be used in the apparatus of FIGS. 1 and 2;

FIG. 5 is an enlarged longitudinal section view showing the interconnection of two portions of the vulcanizing chamber of the apparatus of FIGS. 1 and 2; and FIG. 6 is an enlarged transverse section view of the receiving tank portion of the apparatus of FIGS. 1 and 2;

PRESENTLY PREFERRED EMBODIMENTS

In FIGS. 1 and 2, an apparatus 10 is shown for continuously curing an elastomeric hose assembly 8 shown entering the apparatus 10 by arrow I and leaving the same by arrow 0. The hose assembly 8 as it passes through apparatus 10, comprises a typical elastomeric hose structure 7 and an internal, removable, flexible, support mandrel 9. The mandrel 9 may be typically of solid rubber or plastic (e.g. nylon) (see FIGS. 3,4 or 6).

The hose curing apparatus 10 according to a presently preferred embodiment of this invention comprises, generally, a helically extending vulcanizing chamber 12 having an entrance end 14 and an exit end 16. Adjacent the exit end 16 is a receiving tank 18 and a washing compartment 19. At the entrance end 14 is a special sealing device 15 positioned to receive the hose assembly 8 being driven or fed to chamber 10 by appropriate means such as a pair of endless driving belts 11. The belts 11 are motivated by suitable means such as a motor (not shown) supportably mounted along with the belts 11 on an appropriate frame (not shown). A second special sealing device (not shown in FIGS. 1 and 2), to be described hereinafter, may be provided at the exit end 16, if needed.

A closed fluid circulation system, indicated generally by numeral 20, also forms part of curing apparatus 10 and includes, generally, reservoir 22, pump 24, heating means 26 and fluid recovery means 28. As seen in FIG. 1, the major components of the fluid circulation system 20 can be conveniently located within the inner perimeter confines of helical chamber 12 for optimum space utilization.

VULCANIZING CHAMBER

The helical chamber 12 is preferably composed of a plurality of curved or arcuate sections 32 of tubular steel pipe interconnected so as to helically extend around a vertical axis. As shown in FIGS. 1 and 2, each pipe section 32 is an arcuate section subtending an angle of substantially 90° and is connected, at its ends, to ends of similar pipe sections by appropriately spaced, fluid tight connections 34. Thus, each full helical turn of chamber 12 consists essentially of four pipe sections 32 joined by three connections 34. There are approximately thirteen turns to chamber 12 as it is shown in FIGS. 1 and 2, thus requiring 50 to 52 90° arcuate pipe sections 32, depending on the number of sections used in the upper most and lowermost chamber turns. It is understood that the number of turns in helical chamber 12 and the number of curved pipe sections per turn are not to be considered critical limitations upon the instant invention, and variations in turns, as well as pipe sections per turn are possible, wherever desired. Furthermore, chamber 12 may, if desired, be a single helically formed tube.

Constructing chamber 12 of interconnected, arcuate pipe sections, however, permits easy alteration of chamber length. Also, it is possible to easily modify the vulcanizing chamber into a plurality of helices simply by using horizontally adjacent helical chambers of slightly different widths interconnected appropriately at their lower and/or upper ends. Making chamber 12 in sections also facilitates access to various particular portions of the chamber, when problems at those portions arise.

As seen in FIGS. 1 and 2, the chamber 12 includes a substantially linear entrance pipe section 32' commencing from entrance end 14 and an upwardly curved exit pipe section 32' extending to and terminating in exit end 16. These two pipe sections 32' and 32'' are basically similar in construction to the curved or arcuate pipe sections 32, except for their distinctive contours. Both sections 32' and 32'' are provided with a handled valve 13 serving to open and close flow through the sections, as desired.

Vertically adjacent turns of chamber 12 are separated by a series of vertically aligned spacer members 36 to prevent contact therebetween. Also because of their enlarged diameter, every other one of the fluid tight connections 34 in the vertical direction is shown laterally offset with respect to its immediately adjacent connection to prevent possible interference with each other.

For optimum operation, it is preferred that the helical chamber 12 is insulated (not shown) to prevent heat loss. This can be accomplished by wrapping each component pipe section with appropriate insulation, placing the entire chamber 12 within a suitable insulated housing, or both.

The inner diameter of the interconnected pipe sections should obviously be larger than the outer diameter of the hose assembly to be carried therethrough. It is, however, preferred that the pipe inner diameter be at least 25 to 30% larger than the hose assembly outer diameter for desirable operating conditions.

Referring to FIG. 5, it is seen that each fluid tight connection 34 comprises a pair of annular disc-shaped flanges 33, each having a central threaded opening 35. The threaded opening 35 may have a constant diameter or, as is common, may be slightly tapered. Whether openings 35 are constant diameter or tapered, they are, nevertheless, sized to receive ends of pipe sections 32 suitably threaded at 37. The extreme ends 38 of each pipe section should extend into their respective threaded openings 35 of flanges 33 so as to be as close as possible to each other when the flanges 33 are joined as shown in FIG. 5. Also, it may be desirable to bevel or miter the inner surface edges of ends 38 to reduce the chance of damage to hose moving across the connection. The flanges 33 are secured to each other by typical nut and bolt assemblies 39 as shown. A rubber sealing member 31 is disposed between the mating surfaces of pipe ends 38 and flanges 33.

It is to be understood that although the material comprising chamber 12 has been described as steel, other rigid structural materials can be used, if desired, such as glass, aluminum, brass or the like. Steel is presently preferred primarily due to its being readily available at reasonable cost.

FLUID CIRCULATION

The hose vulcanizing and transporting fluid to be used in the apparatus according to the present invention is preferably an oily liquid which has a boiling point substantially greater than the vulcanization temperature of the hose being vulcanized. Typical liquids for this purpose are suggested in the aforementioned U.S. Pat. No. 3,475,397. Many common elastomeric hose structures are vulcanized at temperatures usually ranging from about 250° to 500°F (110°C to 249°C). The oily liquid utilized to transport and vulcanize hose in chamber 12 should, therefore, be resistant to thermal and oxidative degradation when heated to elevated temperatures, particularly those within the curing temperature ranges of the elastomeric hose structures which it is being used to vulcanize. The liquid utilized should be inert to and have a specific gravity substantially the same as the hose assembly to be transported through and vulcanized in the chamber 12. Also, it may be considered advantageous to select a vulcanizing and transporting fluid for use in the apparatus of this invention which is miscible in water, so that washing of the hose after vulcanization can be a relatively simple operation. Obviously, the liquid should be relatively inert to the materials constituting the interiors of the chamber, pipes, and other structures with which it will come in contact.

As has been indicated, the fluid circulating through chamber 12 to transport and cure the hose assembly 8 is to be introduced to the chamber at an elevated pressure. The specific pressure to which the fluid is elevated is important, as was indicated earlier, in prevention of defects in the hose during its vulcanization in chamber 12. The magnitude selected for this pressure however is also dependent upon various other factors. The total length and the inner diameter of chamber 12 is to be considered when selecting the pressure of fluid. The diameter of the hose assembly to be vulcanized is also to be considered. The speed at which the hose must travel through the chamber for proper cure is also important, since the speed of the fluid which carries the hose is affected by its pressure. Also, the frictional relationship between the hose and the chamber walls is to be considered as well as the respective specific gravities of the hose and the fluid. Various of the more typical specific combinations of these factors usually result in selected fluid pressures ranging between 20 psi to about 150 psi (138 kPa to 1,035 kPa). Referring to FIGS. 1 and 2, hose vulcanizing and transporting fluid circulates through a closed system 20, which includes a storage tank or reservoir 22. Fluid is drawn or gravity fed from reservoir 22 through a conduit 41 to a suitable pump 24, such as a "gear-type" pump, driven by an appropriate motor 23.

The pump 24 pressurizes the fluid to a selected magnitude, for example, 90 to 100 psi, for transport therefrom through conduits 42 and 43 to a heating means 26. The details of heating means are not shown herein in detail but can be any suitable type such as an electrical immersion type heating device or a series of such devices. It is understood that the particular manner of heating the fluid is not critical nor is the particular disposition of the heating means. The heating of the fluid could therefore be accomplished in a variety of devices.

In heating means 26, the fluid is raised to a preselected elevated temperature and, from heating means 26, then passes vertically upwardly through conduit 45 to horizontal conduit 46. A feed conduit 50 below conduit 46 receives hot, pressurized fluid therefrom through intersection 49. A pair of flow control valves 52 are shown in feed conduit 50 on either side of intersection 49.

The feed conduit 50 is definable as two conduits 51 and 53 branching in opposite directions from intersection 49. Fluid entering feed conduit 50 from horizontal conduit 46 can enter entrance pipe section 32' through feed branch conduit 53 and/or be returned to reservoir 22 through feed branch conduit 53. Thus, the velocity of fluid entering entrance pipe 32' from branch 53 is controllable through selective positioning of one, the other, or both of valves 52. A typical flow meter 48 is disposed downstream of valve 52 in branch 53 to visually indicate the velocity of fluid entering entrance pipe section 32'. It can be seen in FIG. 1, that a plurality of valves 52' similar to valves 52 are located at various strategic locations in conduits throughout the system making it possible to isolate various portions from the system for access thereto.

Thus, fluid at a preselected temperature and pressure enters chamber 12, at a velocity determined by its pressure and the settings of valves 52, at a portion of entrance pipe section 32' downstream of entrance end 14 and flows through the helical chamber 12. Hose assembly 8 entering chamber 12 at exit end 14 will be carried by this pressurized hot fluid through chamber 12 while receiving the requisite pressure and heat therefrom for satisfactory vulcanization.

Upon reaching the end of helical chamber 12, the hose and fluid enter upwardly curved exit pipe section 32'' and move toward the exit end 16 of chamber 12. Upstream of exit end 16, however, most of the fluid which at this point has cooled and been substantially de-pressurized, may leave exit pipe 32'' and enter fluid recovery means 28 through a fluid return line 55 branching off exit pipe section 32''. Fluid moves from branch line 55, through vertical conduit 56, though conduit 57 and into and through a strainer S. A by-pass conduit 58 is provided across strainer S in the event strainer S becomes clogged. After passing through strainer S, fluid then is returned to reservoir 22 through conduits 47 and 44.

Because some fluid may flow by branch return line 55 and therefore exit from chamber 12 through end 16, a receiving tank 18 is provided adjacent exit end 16 to divert additional fluid to reservoir 22. Fluid is removed from receiving tank 18 through L-shaped conduit 59 which connects to a bottom drain in tank 18. Conduit 59 connects to reservoir 22 through appropriate branch conduits 54 and 40.

SEALING

As indicated previously, an important aspect of the present invention involves provisions for adequate sealing. Because the hot, vulcanizing and transporting fluid circulating through chamber 12 is at an elevated pressure, means must be provided which allows continuous entry of hose without damage into this pressurized chamber, while at the same time effectively preventing any fluid escape. This problem is complicated further by the flaccid nature of the hose and its tendency to flex or bend along its axis when fed against the pressure of the fluid resisting its continuous entry to the chamber.

An entrance seal device 15 which is particularly suited to this purpose and is disposed at the entrance end 14 of the chamber is shown in accordance with its important details in FIG. 3. The entrance end 14 is shown comprising the end portion of linear entrance pipe section 32' externally threaded at 30 to receive seal device 15. Seal device 15 comprises an annular cap member 62 having an internally threaded, axially extending, annular figure 64 for securing seal device 15 to pipe section 32'. Cap member 62 also comprises an inwardly tapered annular nose portion 66 extending rearwardly of flange 64. The cap member 62 includes a central bore 68 with an axis coinciding with the axis of linear pipe section 32'. The diameter of bore 68 is slightly greater than the outer diameter of hose assembly 8. Bore 68 is made sufficiently long to provide a temporary axial stiffness or rigidity to hose assembly 8 prior to its entry into the pressurized confines of pipe 32' as it passes therethrough in the direction of arrow A. The bore 68 is made to extend into the end portion of pipe section 32' by means of an annular extension 63 which has a frustoconical outer surface to provide a seat for the flexible sealing member component 65 of seal device 15.

The flexible sealing member 65 of sealing device 15 includes an annular, radially extending flange portion 67 held between the forward face of cap member 62 and the end of pipe section 32'. The sealing number 65 further comprises an annular, forwardly inclined, frustoconical portion 69, which terminates at an axial location within the pipe section 32' in an annular hose contacting lip 70. As seen, the frusto-conical portion 69 is supported along its underside by bore extension 63 of cap member 62. The frusto-conical portion 69 with its annular lip 70 is also disposed to be co-axial with the axis of pipe section 32'.

The diameter of annular lip portion 70 is preferably slightly smaller than the outside diameter of hose assembly 8 so that it can maintain effective surface contact therewith as the hose assembly passes therethrough in the direction of arrow A. Also, the flexibility of the sealing member 65 is such as to allow lip 70 to self adjust to any surface irregularities of hose assembly 8. Furthermore, due to the frusto-conical shape of portion 69, the back pressure of vulcanizing fluid present in pipe section 32', as indicated by arrow P, is used to assist in the sealing function. The fluid pressure results in a force applied against the outer frusto-conical surface of portion 69, which force is transmitted ultimately to lip 70 assisting in maintaining the lip 70 in surface contact with the hose.

An annular spacer disc 71 is shown between the outer or rearward surface of flange 67 of sealing member 65 and the inner or forward surface of cap member 62. Selective use of such spacer members, if desired, allow sealing members of the same basic contour as member 65 but different dimensions to be alternatively utilized in conjunction within cap member 62. Also, use of spacers such as 71 results in more or less of the underside of frusto-conical portion 69 to be in supporting contact with bore extension 63 of cap member 62. The degree of underside support of frusto-conical portion 69 by extension 63 is a factor in how back pressure in pipe section 32' affects annular lip 70 in its surface contact with hose assembly 8.

The sealing member 65, as indicated, should be sufficiently flexible to permit sealing contact hose assembly 8 without damage, to self adjust to hose assembly surface irregularities and to utilize the back pressure in the chamber as an assist to its sealing function. The sealing member 65 should also be resistant to heat and to degradation by the vulcanizing fluid used in the apparatus. Materials found suitable are easily molded, heat resistant rubbers such as acrylates or silicones. "Viton" made by DuPont has been found to be an excellent material for this purpose. Some non-rubbery polymers, such as "Teflon", made by DuPont, are also considered adequate.

In FIG. 4, an optional exit sealing device 80 is shown which may be used at the exit end 16 of chamber 12. This device may be used as an alternative to receiving tank 18, or, it may be used to supplement the function of receiving tank 18. The function of exit sealing device 80 is primarily to prevent at least a major portion of the transporting and vulcanizing fluid from exiting from the chamber while permitting undamaged and continuous exit of the vulcanized hose therefrom.

Such sealing device 80 comprises a cap member 18 having a radially outer, annular, axially extending flange 84 having an internally threaded portion 83 adapted to mate with an externally threaded portion 81 along the end of pipe section 32''. Cap portion 82 further includes an annular, axially extending portion 86 spaced radially inwardly from flange 84 which terminates a selected distance inward of the pipe section 32''. Cap portion 82 also contains a central bore 85 having a diameter slightly greater than hose assembly 8 which bore 85 is defined by the inner surface of axially extending portion 86.

Sealing device 80 further comprises a flexible sealing member 88 which comprises an upstream or forward bell-shaped portion 87 and downstream or rearward mounting annulus 89. The forward larger diameter end of bell-shaped portion 88 is of a diameter sufficient to contact the inner surface of pipe section 32'' while the rearward or downstream end of bell-shaped portion 88 is of a diameter sufficient to maintain sealing surface contact with hose assembler 8 passing therethrough. The rearward mounting annulus 89 of sealing member 88 is of a diameter sufficient to embrace the outer surface of radially inner, axially extending portion 86 of cap member 82. A rigid mounting ring 90 may be provided to hold mounting annulus 89 in its position.

Because exit seal 80, if used, is disposed downstream of return branch 55 (see FIG. 2), bell-shaped portion 89 of sealing member 88 will prevent, to a large extent, continued passage of fluid beyond the end of pipe section 32'' and force such fluid to return to reservoir 22 through branch line 55 as hereinbefore described.

HOSE RECEIVING AND WASHING

Whether or not an exit sealing device as hereinabove described is used, it is considered advisable to provide additional means adjacent the exit end of the chamber to achieve as complete a segregation of hose and fluid as possible. For this purpose, the vulcanized hose assembly and any fluid accompanying same, upon passage from the chamber enters a receiving tank 18 and washing compartment 19. A perforated, semi-circular trough extends through both tank 18 and compartment 19 which allows liquid to drain from hose assembly 8 as it moves along this trough 17.

Receiving tank 18 comprises a rigid rectangular housing 21 with typical top, side, bottom and end walls. The end walls are provided with openings allowing the hose continuous passage into and out of the housing 21. Mounted within the housing 21 are longitudinally spaced baffle plates 72 each having an opening 74 (see FIG. 6) concentric with the end wall openings (not shown). The openings 74 are sized to allow passage therethrough of hose assembly 8 as it travels along trough 17. The baffles 74 operate to block continuous passage of any transporting and vulcanizing fluid which had not been returned to reservoir 22 via return conduit 55 of fluid recovery means 28. The fluid diverted by baffles 72 is collected along the bottom of housing 21 and returned to reservoir 22 via conduit 59 as hereinabove described.

Passing from tank 18 along trough 17, the hose assembly 8 enters washing compartment 19 which also comprises a rectangular housing 25 with typical top, bottom, side and end walls and which end walls are provided with suitable openings as in housing. Any liquid which remains adhered to hose assembly is here washed from the hose by liquid from a series of suitable sprays 27. The washing liquid selected depends upon the type of transporting and vulcanizing fluid used as well as the hose assembly material.

It is evident that many of the individual features of the apparatus described are capable of obvious modification and replacement by full equivilants without departure from the inventive concept to be measured by the following claims.

What is claimed is:

1. Apparatus for vulcanizing elastomeric hose comprising:
   A. a vulcanizing chamber of substantially circular cross-section extending helically about a vertical axis, said chamber having
      1. an entrance end;
      2. an exit end;
   B. means circulating fluid at selected elevated temperature and pressure through the chamber from adjacent the entrance end to the exit end;
   C. fluid recovery means adjacent the exit end of the chamber;
   D. means for recycling fluid recovered by the recovery means to the fluid circulating means;
   E. sealing means at the entrance end of the chamber for
      1. permitting unvulcanized hose to enter the chamber through the entrance end for transport through the chamber by the circulating fluid and
      2. preventing fluid from leaving the chamber through the entrance end while the hose is entering the chamber, the sealing means comprising
         a. an annular rigid cap member having a nose portion providing an elongated hose receiving and stiffening zone adjacent the entrance end, and
         b. a flexible, polymeric seal member having
            i. an annular mounting flange secured between said cap member and said entrance end, and
            ii. an annular portion extending into the chamber from the entrance end, terminating in a hose contacting lip, and having a surface exposed to the pressurized fluid in the chamber and a contour adapted to utilize the pressure of the fluid to promote sealing contact between the lip and hose.

2. The apparatus defined in claim 1 wherein the chamber comprises a plurality of arcuately curved pipe sections joined end to end by fluid tight connections.

3. The apparatus defined in claim 1 further comprising:
   F. a hose receiving tank adjacent the exit end of the chamber having means therein to
      1. separate fluid from the hose after leaving the chamber and
      2. collecting the separated fluid for transport to the recycling means.

4. The apparatus defined in claim 3 wherein the chamber comprises a plurality of arcuately curved pipe sections joined end to end by fluid tight connections.

5. The apparatus defined in claim 3 further comprising:
   G. a hose washing compartment adjacent the hose receiving tank, the compartment having means therein for applying liquid to the hose to wash adhering fluid therefrom.

6. The apparatus defined in claim 5 wherein the chamber comprises a plurality of arcuately curved pipe sections joined end to end by fluid tight connections.

* * * * *